United States Patent

[11] 3,546,416

| [72] | Inventors | Eli Roseta;<br>Lawrence M. Rogers, Chicago, Illinois |
|---|---|---|
| [21] | Appl. No. | 655,806 |
| [22] | Filed | July 25, 1967 |
| [45] | Patented | Dec. 8, 1970 |
| [73] | Assignee | Continental Can Company, Inc.<br>New York, New York<br>a corporation of New York |

[54] INTERNAL ELECTRODE DRIVE
8 Claims, 3 Drawing Figs.

| [52] | U.S. Cl. | 219/81 |
|---|---|---|
| [51] | Int. Cl. | B23k 11/06 |
| [50] | Field of Search | 219/81; 66, 64, 82, 83, 84 |

[56] References Cited
UNITED STATES PATENTS

| 2,322,796 | 6/1943 | Fentress | 219/66 |
|---|---|---|---|
| 3,071,115 | 1/1963 | Schott | 91/76 |
| 3,132,233 | 5/1964 | Perry et al. | 219/81 |
| 2,454,948 | 11/1948 | Seltzer | 219/66 |

*Primary Examiner*—J. V. Truhe
*Assistant Examiner*—Lawrence A. Rouse
*Attorney*—Diller, Brown, Ramik & Holt

ABSTRACT: This disclosure has to do with a drive for an internal roller electrode of a seam welding apparatus. A power unit is coupled to the roller electrode for driving the same substantially at the same speed as the tubular member being welded with the power unit being of the combined slip and overrunning type whereby there will be automatic compensation for a differential in speed between a workpiece and the roller electrode.

PATENTED DEC 8 1970 3,546,416

INVENTORS
ELI ROSETA &
LAWRENCE M. ROGERS
BY
Mason, Porter, Diller & Brown
ATTORNEYS

3,546,416

INTERNAL ELECTRODE DRIVE

This invention relates in general to new and useful improvements in welding apparatus and more specifically to a seam welder for use in forming tubular members, such as cans.

Seam welders for forming the side seams of tubular members include a combined support and guide horn in which there is mounted an internal roller electrode. Normally this internal roller electrode is driven by engagement with the tubular member being welded. However, in some instances this is detrimental in that the metal engaged by the roller electrode is very hot, approaching the molten stage, and there is tendency for the drag of the roller electrode to effect the building up of a wave of relatively soft metal in front of the roller electrode. Accordingly, in accordance with this invention, it is proposed to drive the roller electrode at a speed substantially equal to the speed of movement of the tubular member being welded.

It is another object of this invention to provide a power unit for driving the roller electrode which may be overridden, both below and above the normal operating speed thereof, so as to permit the roller electrode to be moved at the same peripheral rate as the tubular member being welded.

A further object of this invention is to provide a simple mounting within a horn of a welding apparatus for receiving a power unit, an internal roller electrode, and a gear drive mechanism coupling the roller electrode to the power unit.

With the above and other objects in view that will hereinafter appear, the nature of the invention will be more clearly understood by reference to the following detailed description, the appended claims and the several views illustrated in the accompanying drawings:

IN THE DRAWINGS

Figure 3:
FIG. 3 is a transverse vertical sectional view taken along the line 3–3 of FIG. 1 and shows more specifically the details of the means for driving the roller electrode.

Referring now to the drawings in detail, it will be seen that there is illustrated a horn of a welding apparatus, the horn being generally referred to by the numeral 5. In order to effect the welding of a seam of a tubular member (not shown), the horn has mounted therein for rotation an internal roller electrode 6. The internal roller electrode 6 has associated therewith an external roller electrode 7.

In the forming of a welded seam on a tubular member, the tubular member is moved along the horn 5 by suitable conveying means (not shown) at a predetermined speed. In the past, the roller electrodes 6 and 7 have been driven by the tubular member being welded. However, those portions of the tubular member which form the seam thereof are heated to a very high temperature approaching the melting temperature of the metal and there is a tendency of the drag of the roller electrodes 6 and 7 on this very hot metal to elongate the metal and to cause a ripple or wave in the metal. Therefore, in accordance with this invention, there is provided a drive for the internal roller electrode 6. The external roller electrode may be driven in any desired manner if it is so desired.

A further requirement is that the peripheral speed of movement of the internal roller electrode 6 must be the same as that of the tubular member being welded. It is quite apparent that it is extremely difficult to provide two separate drives which will always operate at the same speed. Therefore, it is desirable to provide a drive for the internal roller electrode 6 which may be overridden by the tubular member, either negative or positive with the primary driving force on the roller electrode 6 being from the drive therefor.

In accordance with this invention, the horn 5 is provided with a flat 8 thereon and the flat 8 is, in turn, hollowed as at 9 to receive a fluid motor 10. The fluid motor 10 is clamped in place by a pair of removable straps 11 which are secured in place by means of suitable fasteners 12. The fluid motor 10 is preferably in the form of an air motor and includes an elongated housing or body 13 which extends axially of the horn 5 and is generally located along the center thereof. The body 13 has projecting from one end thereof a drive shaft 14. The drive shaft 14 is coupled to the internal roller electrode 6 by means of a gear type coupling unit which is generally referred to by the numeral 15.

It is to be noted that the end of the body 13 remote from the drive shaft 14 is engaged with a gasket member 16 which forms a seal between the body 13 and the horn 5. The gasket member 16 is hollow and provides for the communication of an air supply passage 17 with an inlet of the air motor 10. Compressed air is supplied to the air inlet 17 through an air line 18.

Figure 2:
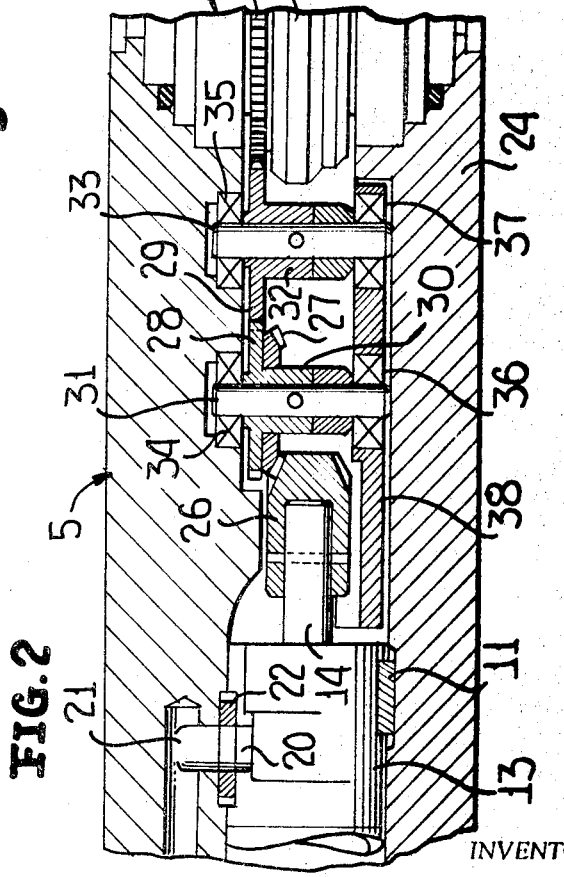
FIG. 2 is a fragmentary longitudinal sectional view taken along the line 2–2 of FIG. 1 and shows more specifically the details of the coupling means for coupling the power unit to the roller electrode.

The body 13, as is best shown in FIG. 2, is also provided with an outlet passage 20 which is alined with a return passage 21 formed in the horn 5. The passages 20 and 21 are coupled in sealed relation by means of a gasket 22 disposed between the body 13 and the horn 5.

It will be apparent from the foregoing description of the mounting of the air motor 10 that it is merely necessary to seat the same in the cavity 9 with the gaskets 16 and 22 in compressed relation and thereafter to clamp the air motor 10 in place by means of the straps or clamps 11. No other coupling is required to mount the air motor 10 and to place it in communication with the various air supply return lines.

At this time it is pointed out that the internal roller electrode 6 is part of a rotary joint, which is generally referred to by the numeral 23. The rotary joint 23 is of a construction which permits the rotation of the internal roller electrode 6 while supplying high amperage electrical energy to the roller electrode 6. The specific details of construction of the rotary joint 23 do not form part of this invention except for the fact that it is releaseably clamped in the horn 5 by means of a cover plate 24 which serves a dual purpose and which is described in more detail hereinafter. The rotary joint 23 does, however, carry a gear ring 25 which is coupled to the roller electrode 6 for rotation therewith.

The gear coupling unit 15 includes a bevel gear 25 26 which is mounted on the drive shaft 14 and which meshes with a second bevel gear 27 which, in turn, is connected to a spur gear 28. The spur gear 28 is meshed with a further spur gear 29 which, in turn, is meshed with the gear 25 so as to drive the roller electrode 6 from the drive shaft 14.

At this time it is pointed out that the gears 27 and 28 have a common hub 30 which is journaled on a shaft 31 for rotation therewith. Also, the gear 29 is carried by a hub 32 which is mounted on a shaft 33 for rotation therewith. First ends of the shafts 31 and 33 are rotatably journaled in bearings 34 and 35, respectively, which are seated in respective sockets in the horn 5. The second ends of the shafts 31 and 33 are rotatably journaled in bearings 36 and 37, respectively, which are carried by a plate 38. The plate 38 is releaseably secured to the flat 8 of the horn 5 by means of fasteners 40, as is clearly shown in FIGS. 1 and 3.

Figure 1:
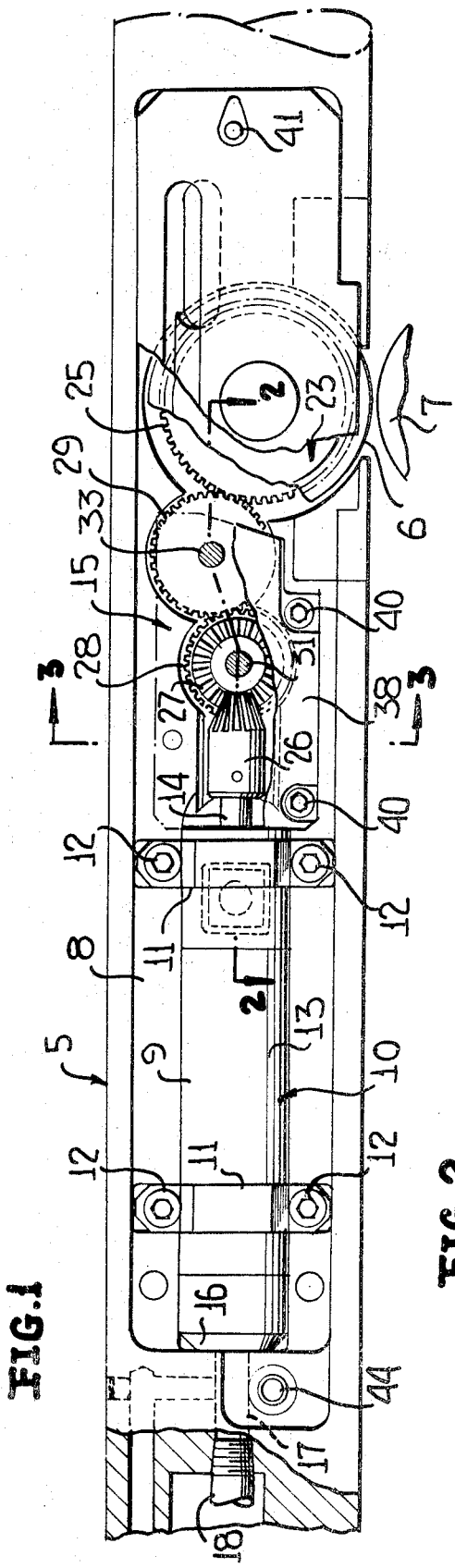
FIG. 1 is a side elevational view of a horn of a welding apparatus formed in accordance with this invention, portions of the horn being broken away and shown in section in order to clearly illustrate the manner in which the roller electrode is driven.

After the power unit 10 and the gear drive unit 15 have been installed in the horn 5, the rotary joint 23 and the internal roller electrode 6 carried thereby may be slipped into place and the whole unit enclosed within the horn 5 by the application of the cover 24. The cover 24 is secured in place by means of suitable fasteners, such as the fastener 41 of FIG. 1. It is to be noted that this assembly permits the replacement of the rotary joint 23 without the removal of either the power unit 10 or the gear drive unit 15. At this time it is also pointed out that the rotary joint 23 has a coolant circulated therethrough with the coolant flowing through passages 42 and 43, as is shown in FIG. 3. The coolant passage 43 extends through the cover 24 with the coolant being delivered to the coolant passage 43 through a coolant passage 44 in the horn proper, as is shown in FIG. 1.

It will be readily apparent that by utilizing an air motor as the power unit, a proper driving of the internal electrode 6 may be accomplished even though the horn 5 may have a diameter on the order of 2½ inches. Furthermore, it will be seen that inasmuch as the air motor may either be underdriven or overdriven by the reaction of a tubular member being welded against the internal roller electrode 6, the power unit 10 need be driven only at a speed necessary to drive the internal roller electrode 6 at approximately the speed of movement of the tubular member being welded and any slight differential in rate of movement will be compensated for by the overdriving or underdriving action.

Although only a preferred embodiment of the drive assembly for the internal roller electrode has been specifically illustrated and described herein, it is to be understood that minor variations may be made in the drive assembly without departing from the spirit of the invention.

We claim:

1. In a welding apparatus for welding seams in tubular members, a combined support and guide horn, an internal roller electrode mounted within said horn, a power unit mounted within said horn, and coupling means coupling said power unit to said internal roller electrode for driving said internal roller electrode at a predetermined rate.

2. The welding apparatus of claim 1 wherein said power unit is of the combined slip and overrunning type whereby there will be automatic compensation for a differential in speed between a tubular member and said internal roller electrode.

3. The welding apparatus of claim 1 wherein said power unit is of the fluid actuated type providing for both slip and overrunning action whereby there will be automatic compensation for a differential in speed between a tubular member and said internal roller electrode.

4. The welding apparatus of claim 1 wherein said power unit is elongated axially of said horn and has a drive shaft extending axially of said horn, and said coupling means being of the right angle drive type.

5. The welding apparatus of claim 1 wherein said coupling means are in the form of a gear unit mounted entirely within said horn between said power unit and said roller electrode.

6. The welding apparatus of claim 1 wherein said horn has a single cover plate providing access to said internal roller electrode, said power unit and said coupling means.

7. The welding apparatus of claim 6 wherein said roller electrode is part of a rotary joint having coolant circulating means, and said cover plate has a coolant passage extending therethrough.

8. The welding apparatus of claim 6 wherein said cover plate forms part of a support for said internal roller electrode.